United States Patent
Woodward et al.

(10) Patent No.: US 7,879,964 B2
(45) Date of Patent: Feb. 1, 2011

(54) BIODEGRADABLE POLYMERS

(75) Inventors: Gary Woodward, Cheshire (GB); Graham Philip Otter, Worcestershire (GB); Keith Philip Davis, Staffordshire (GB); Kim Carmichael, Coventry (GB)

(73) Assignee: Rhodia Consumer Specialties Limited, Hertfordshire (GB)

( * ) Notice: Subject to any disclaimer, the term of this patent is extended or adjusted under 35 U.S.C. 154(b) by 930 days.

(21) Appl. No.: 10/539,436

(22) PCT Filed: Dec. 19, 2003

(86) PCT No.: PCT/GB03/05570

§ 371 (c)(1),
(2), (4) Date: Jun. 5, 2007

(87) PCT Pub. No.: WO2004/056886

PCT Pub. Date: Jul. 8, 2004

(65) Prior Publication Data

US 2007/0282086 A1    Dec. 6, 2007

(30) Foreign Application Priority Data

Dec. 20, 2002    (GB) ................................ 0229684.6

(51) Int. Cl.
*C08F 30/02*    (2006.01)
(52) U.S. Cl. ..................... 526/274; 526/277; 526/278
(58) Field of Classification Search ................. 526/274, 526/277, 278
See application file for complete search history.

(56) References Cited

U.S. PATENT DOCUMENTS

| 5,077,361 | A | 12/1991 | Hughes et al. |
| 5,216,099 | A | 6/1993 | Hughes et al. |
| 5,294,687 | A | 3/1994 | Blankenship et al. |
| 5,866,664 | A | 2/1999 | McCallum, III et al. |
| 6,071,434 | A | 6/2000 | Davis et al. |
| 6,624,273 | B1 * | 9/2003 | Everaerts et al. ......... 526/317.1 |

FOREIGN PATENT DOCUMENTS

| EP | 0 405 818 A | 1/1991 |
| EP | 0 405 818 A2 | 1/1991 |
| EP | 0 510 831 A1 | 10/1992 |
| EP | 0 792 890 A1 | 9/1997 |
| EP | 0 861 846 A | 9/1998 |
| EP | 0 861 846 A2 | 9/1998 |
| JP | 2000-198809 A | 7/2000 |

* cited by examiner

*Primary Examiner*—Edward J Cain
(74) *Attorney, Agent, or Firm*—Holtz, Holtz, Goodman & Chick, P.C.

(57) ABSTRACT

A phosphorus-containing polymer is provided comprising the reaction product of a chain-transfer agent having at least one pH bond with an unsaturated carboxylic, phosphonic or sulphonic acid. The invention also provides the aforementioned phosphorus-containing polymer further comprising phosphorus-containing end-caps. The polymers have a biodegradability of at least 20% per 28 days (as determined by OECD 306).

26 Claims, No Drawings

BIODEGRADABLE POLYMERS

This application is a U.S. National Phase Application under 35 USC 371 of International Application PCT/GB2003/005570, filed Dec. 19, 2003.

This invention relates to biodegradable polymers, especially phosphorus-containing polymers which meet or exceed the minimum statutory requirements for biodegradability. This invention also relates to a method of making such polymers and to their use as scale-inhibitors in oilfield applications.

There is a need for more environmentally benign chemicals to be used in the extraction of petroleum from subsea reservoirs, such as those located in the North Sea. Chemicals that may ultimately be discharged to the marine environment must have low toxicity towards marine organisms and should not exhibit a tendency to build up in their tissues (bio-accumulate). It is also desirable that a product does not accumulate in the environment, but can be degraded chemically or by the action of micro-organisms (biodegradation). Thus, the authorities who regulate the use of chemicals in the North Sea stipulate a threshold of at least 20% biodegradation in 28 days (OECD 306) as part of the "pre-screening" test for the 'CHARM' model, which is currently used to assess environmental impact.

Polymers having phosphorus-containing end-caps, especially polymers comprising acrylic acid, are widely used as scale-inhibitors, particularly in oilfield applications. Examples of such polymers are disclosed in the applicant's EP-A-0 861 846, the contents of which are incorporated herein by reference.

It is known that the biodegradability of acrylic acid-containing polymers, which are generally poorly biodegraded, is greatly improved by reducing the weight average molecular weight (Mw) below 700 Daltons. See, for example, J. Environ. Polym. Degrad., 1997, 5, p41-48. It was suggested that one possible means of producing polymers with Mw in this region might be afforded by the use of the lower oxo acids of phosphorus (III) and their salts as chain-transfer agents, but it was by no means certain that the resulting polymers would be as biodegradable as the corresponding phosphorus-free polyacrylates. Such polymers are being increasingly utilised as scale inhibitors during the secondary recovery of oil from reservoirs with very demanding water chemistry and conditions, so it is important that low molecular weight modifications retain this functionality. The effect of reducing molecular weight on scale inhibitor performance is again not predictable: for simple polycarboxylates there is often an optimum range of molecular weight, either side of which performance often falls off markedly.

The present invention provides, in a first aspect, a phosphorus-containing polymer comprising the reaction product of an unsaturated phosphonic acid with a chain-transfer agent, the polymer having improved biodegradability as compared to the same polymer when made in the absence of the chain-transfer agent.

Preferably, the polymer has a biodegradability of at least 20% per 28 days (as determined by OECD 306).

The chain-transfer agent may be, for example, (a) benzene, toluene, ethylbenzene or chlorobenzene;

(b) methylene chloride, ethylene chloride, chloroform or carbon tetrachloride;

(c) acetone, thiophenol, n-butyl thiol or dodecyl thiol.

We have found that by the use of chain-transfer agents containing at least one 'P—H' bond, it is possible to produce polymers which combine excellent activity as oilfield scale inhibitors with good biodegradability, often in excess of that required by 'OECD 306'.

In a first preferred embodiment of the first aspect of the present invention, there is provided a phosphorus-containing polymer comprising the reaction product of a chain-transfer agent having at least one P—H bond with an unsaturated carboxylic, phosphonic or sulphonic acid, the polymer having a biodegradability of at least 20% per 28 days (as determined by OECD 306).

We have also found that polymers which include phosphorus-containing end-caps can have a desirably high biodegradability as well as being effective as oilfield scale inhibitors.

Thus, in a second preferred embodiment of the first aspect of the present invention, there is provided a polymer having phosphorus-containing end-caps and comprising the reaction product of a chain-transfer agent having at least one P—H bond with an unsaturated carboxylic, phosphonic or sulphonic acid, said polymer having a biodegradability of at least 20% per 28 days (as determined by OECD 306).

Preferably, the chain-transfer agent having at least one P—H bond is hypophosphorous acid or a water-soluble salt (such as an alkali metal salt or ammonium salt) of said acid.

Preferably, the unsaturated carboxylic acid is acrylic acid or a water-soluble salt of said acid.

Alternatively, the unsaturated carboxylic acid may be, for example, methacrylic acid, maleic acid, fumaric acid, itaconic acid, aconitic acid, citraconic acid, mesaconic acid, crotonic acid, isocrotonic acid, angelic acid or tiglic acid (or a water-soluble salt of any of said acids).

Suitably, the unsaturated phosphonic acid is vinylphosphonic acid (VPA) or vinylidene-1,1-diphosphonic acid (VDPA) or a water-soluble salt of either of said acids.

Preferably, the unsaturated sulphonic acid is vinylsulphonic acid (VSA) or a water-soluble salt of said acid.

In a third preferred embodiment of the first aspect of the present invention, the polymer comprises a telomer which is the reaction product of an adduct of vinylphosphonic acid and hypophosphorous acid (hereinafter referred to as "PPE-endcapper") with acrylic acid, said telomer being hereinafter referred to as a "PPE-endcapped polyacrylate".

The ratio of the PPE-endcapper to acrylic acid is suitably in the range 1:5 to 1:20 molar and preferably about 1:10 molar.

Preferably, the polymers according to the present invention exhibit a weight average molecular weight such that at least 20% by weight of the polymer has a weight average molecular weight of 1000 or lower. More preferably, at least 35% by weight of the polymer has a weight average molecular weight of 1000 or lower.

In a second aspect, the present invention provides a method of making a polymer according to the first aspect of the present invention, in which the chain-transfer agent and the unsaturated acid are reacted together in the presence of a free-radical initiator.

The free-radical initiator is preferably an alkali metal persulphate (especially sodium persulphate).

Alternatively, the free-radical initiator may be an alkali metal peracetate, hydrogen peroxide, a hydroperoxide, chlorine dioxide, an alkali metal chlorate or hypochlorite, an organometallic hydride, an azo-compound (e.g. 4,4'-azo-biscyanovaleric acid), electrolysis, ultraviolet or other ionising radiation, ultrasound, or any combination of the foregoing.

The present invention provides, in a third aspect, a polymer made by the method disclosed in the three immediately-preceding paragraphs.

In a fourth aspect, the present invention provides the use, as a scale-inhibitor for oilfield applications, of a polymer according to the first or third aspects of the present invention.

Preferred embodiments of the present invention will be illustrated by way of the following Examples.

EXAMPLE 1

A PPE-endcapped polyacrylate (Ref. KH59, ratio of PPP-endcapper to acrylic acid 1:10 molar) was prepared as follows:

The reagents shown in TABLE A (below) were taken

TABLE A

| Reagent | Quantity (g) | Dilution (ml water) | Formula Weight | Quantity (moles) |
|---|---|---|---|---|
| Acrylic acid (99%) | 144 | 486 | 72 | 1.98 |
| Sodium hydroxide (46-48%) | 60 | — | 40 | 0.71 |
| *PPE-endcapper (17.2%) | 280 | — | 240 | 0.20 |
| Sodium persulphate | 23.8 | 177.4 | 238 | 0.10 |

*The endcapper consisted essentially of trisodium 1-phosphono-2-phosphino ethane, prepared according to the disclosure in the applicants' EP-A-0 861 846.

Half of the PPE endcapper (140 g, 0.1 mol) was charged to a 1-liter jacketed reactor, stirred and heated to 95° C.

Meanwhile, three feeds were prepared:

Feed (1) An initiator solution of sodium persulphate (23.8 g, 0.1 mol) and water (177.4 g);

Feed (2) Acrylic acid (144 g, 1.99 mol) was diluted with ice (200 g) and water (286 g). The pH was adjusted to 4 by addition of the sodium hydroxide solution (60 g of 46-48% solids, 0.71 mol). Half of this total solution (690 g×½=345 g) was added to the other half of the PPE endcapper (140 g, 0.10 mol) to give 485 g of Feed 2;

Feed (3) The remaining acrylate solution (345 g).

Once the reaction temperature had been reached, Feeds 1 and 2 were simultaneously started by means of separate peristatic pumps. Feed 1 was added over 8 hours and Feed 2 was added in at a steady rate over 4 hours. On completion of Feed 2, Feed 3 was added over 3½ hours. Therefore, the initiator Feed (1) runs for ½ hour longer than Feed 3. When all feeds had finished, the reaction was kept at reflux for a further ½ hour, then allowed to cool (total reaction time=8½ hours).

At this stage the product was at a concentration of 16.3% w/w actives. To achieve the desired concentration of 25% w/w actives (32.6% w/w solids), water (403 g) was removed by rotary evaporation. (Concentrations based on 100% yield).

EXAMPLE 2

Another PPE-endcapped polyacrylate (Ref. KH70, ratio of PPE endcapper to acrylic acid 1:10 molar) was prepared by the method of Example 1 (above), except that in the preparation of Feed 2, the acrylic acid was fully neutralised with the sodium hydroxide solution, so that the reaction was carried out at pH7 instead of pH4.

Performance and Biodegradability Tests

The products of Example 1 and Example 2 (above), together with two comparative products, were subjected to the Tube Block Test described in our published application WO 01/57050, Example 3, and to the Biodegradability Test (OECD 306). The results are set out in TABLE B (below). In each case, a PPE-endcapped polyacrylate in which the PPE endcapper was trisodium 1-phosphono-2-phosphino-ethane was used.

TABLE B

| Product | PPE to Acrylic acid ratio (molar) | Weight Average Molecular Weight (g/ml) | % Product with Mw below 100 | Tube Block test (ppm active acid) | Bio-degradability (% per 28 days) |
|---|---|---|---|---|---|
| Comparative A (B13L1) | 1:20 | 3994 | 18 | 120, 120, 120 | 15 |
| Comparative B (KH71) | 1:15 | 2680 | 25 | 100, 100, 120 | 5 |
| Example 1 (KH59) | 1:10 | 2598 | 42 | 120, 120, 120 | 23 |
| Example 2 (KH70) | 1:10 | 2116 | 31 | 100, 120, 120 | 28 |

It will be seen that the products of Examples 1 and 2 of the present invention each satisfied the conditions of OECD 306.

The invention claimed is:

1. A phosphorus-containing polymer, comprising the reaction product of an unsaturated phosphonic acid with a chain-transfer agent, the polymer having improved biodegradability as compared to the same polymer when made in the absence of the chain-transfer agent in which the chain-transfer agent is benzene, toluene, ethylbenzene, chlorobenzene, methylene chloride, ethylene chloride, chloroform or carbon tetrachloride.

2. A polymer according to claim 1, in which the chain-transfer agent is benzene, toluene, ethylbenzene or chlorobenzene.

3. A polymer according to claim 1, in which the chain-transfer agent is methylene chloride, ethylene chloride, chloroform or carbon tetrachloride.

4. A phosphorus-containing polymer comprising the reaction product of a chain-transfer agent having at least one P—H bond with an unsaturated carboxylic, phosphonic or sulphonic acid, the polymer having a biodegradability of at least 20% per 28 days (as determined by OECD 306).

5. A polymer according to claim 4, having phosphorus-containing end-caps and comprising the reaction product of a chain-transfer agent having at least one P—H bond with an unsaturated carboxylic, phosphonic or sulphonic acid, said polymer having a biodegradability of at least 20% per 28 days (as determined by OECD 306).

6. A polymer according to claim 4, in which the chain-transfer agent having at least one P—H bond is hypophosphorous acid or a water-soluble salt of said acid.

7. A polymer according to claim 6, in which the chain-transfer agent is an alkali metal salt or an ammonium salt of hypophosphorous acid.

8. A polymer according to claim 4, in which the unsaturated carboxylic acid is acrylic acid or a water-soluble salt of said acid.

9. A polymer according to claim 4, in which the unsaturated carboxylic acid is methacrylic acid, maleic acid, fumaric acid, itaconic acid, aconitic acid, citraconic acid, mesaconic acid, crotonic acid, isocrotonic acid, angelic acid, tiglic acid or a water-soluble salt of any of said acids.

10. A polymer according to claim 1, in which the unsaturated phosphonic acid is vinylphosphonic acid (VPA), vinylidene-1,1-diphosphonic acid (VDPA) or a water-soluble salt of either of said acids.

11. A polymer according to claim 4, in which the unsaturated sulphonic acid is vinylsulphonic acid (VSA) or a water-soluble salt of said acid.

12. A phosphorus-containing polymer, comprising the reaction product of an unsaturated phosphonic acid with a chain-transfer agent, the polymer having improved biodegradability as compared to the same polymer when made in the absence of the chain-transfer agent, the polymer comprising a telomer which is the reaction product of an adduct of vinylphosphonic acid and hypophosphorous acid (hereinafter referred to as a PPE-endcapper) with acrylic acid.

13. A polymer according to claim 12, in which the ratio of the PPE-endcapper to acrylic acid is in the range 1:5 to 1:20 molar.

14. A polymer according to claim 13 in which the ratio of the PPE-endcapper to acrylic acid is about 1:10 molar.

15. A phosphorus-containing polymer, comprising the reaction product of an unsaturated phosphonic acid with a chain-transfer agent, the polymer having improved biodegradability as compared to the same polymer when made in the absence of the chain-transfer agent, in which at least 20% by weight of the polymer has a weight average molecular weight of 1000 or lower.

16. A polymer according to claim 15, in which at least 35% by weight of the polymer has a weight average molecular weight of 1000 or lower.

17. A method of making a polymer which is a phosphorus-containing polymer comprising the reaction product of an unsaturated phosphonic acid with a chain-transfer agent, the polymer having improved biodegradability as compared to the same polymer when made in the absence of the chain-transfer agent, the method comprising the step of the chain-transfer agent and the unsaturated acid being reacted together in the presence of a free-radical initiator, the free-radical initiator being alkali metal persulphate or 4,4'-azo-bis-cyanovaleric acid.

18. A method according to claim 17, in which the free-radical initiator is an alkali metal persulphate.

19. A method according to claim 17, in which the free-radical initiator is sodium persulphate.

20. A method according to claim 17, in which the free-radical initiator is 4,4'-azo-bis-cyanovaleric acid.

21. A polymer according to claim 4 in which the unsaturated phosphonic acid is vinylphosphonic acid (VPA) vinylidene-1,1-diphosphonic acid (VDPA) or a water-soluble salt of either of said acids.

22. A polymer according to claim 4, comprising a telomer which is the reaction product of a PPE-endcapper with acrylic acid, wherein said PPE-endcapper is a reaction product of an adduct of vinylphosphonic acid and hypophosphorous acid.

23. A method of making a polymer, which is a phosphorus-containing polymer comprising the reaction product of a chain-transfer agent having at least one P—H bond with an unsaturated carboxylic, phosphonic or sulphonic acid, the polymer having a biodegradability of at least 20% per 28 days (as determined by OECD 306), in which method the chain-transfer agent and the unsaturated acid are reacted together in the presence of a free-radical initiator.

24. A method of making a polymer, which is a phosphorus-containing polymer, comprising the reaction product of an unsaturated phosphonic acid with a chain-transfer agent, the polymer having improved biodegradability as compared to the same polymer when made in the absence of the chain-transfer agent, in which the chain-transfer agent is benzene, toluene, ethylbenzene, chlorobenzene, methylene chloride, ethylene chloride, chloroform or carbon tetrachloride, in which method the chain-transfer agent and the unsaturated acid are reacted together in the presence of a free-radical initiator.

25. A method of making a polymer, which is a phosphorus-containing polymer, comprising the reaction product of an unsaturated phosphonic acid with a chain-transfer agent, the polymer having improved biodegradability as compared to the same polymer when made in the absence of the chain-transfer agent, the polymer comprising a telomer which is the reaction product of an adduct of vinylphosphonic acid and hypophosphorous acid with acrylic acid, in which method the chain-transfer agent and the unsaturated acid are reacted together in the presence of a free-radical initiator.

26. A method of making a polymer, which is a phosphorus-containing polymer comprising the reaction product of an unsaturated phosphonic acid with a chain-transfer agent, the polymer having improved biodegradability as compared to the same polymer when made in the absence of the chain-transfer agent, in which at least 20% by weight of the polymer has a weight average molecular weight of 1000 or lower, in which method the chain-transfer agent and the unsaturated acid are reacted together in the presence of a free-radical initiator.

\* \* \* \* \*